UNITED STATES PATENT OFFICE.

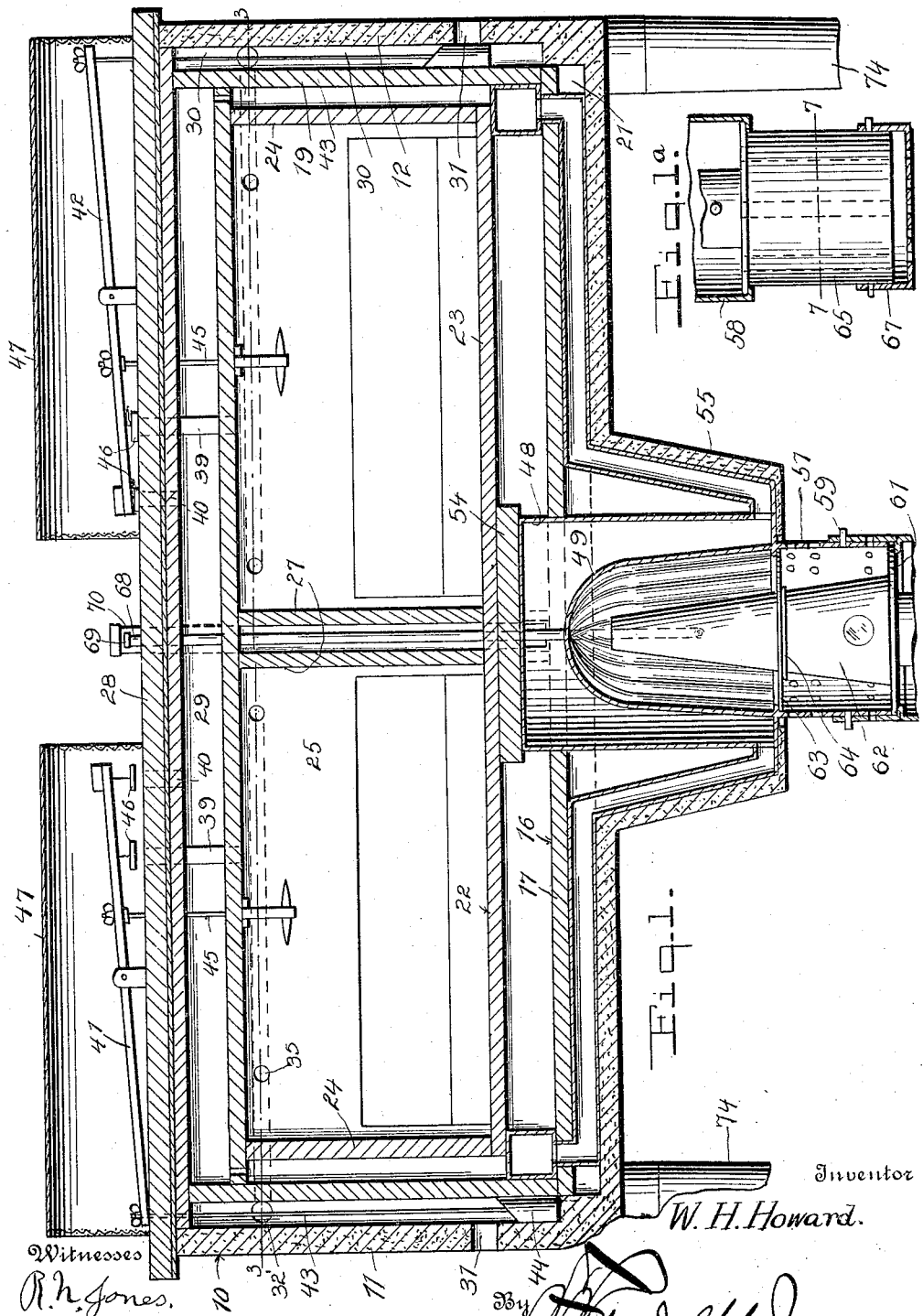

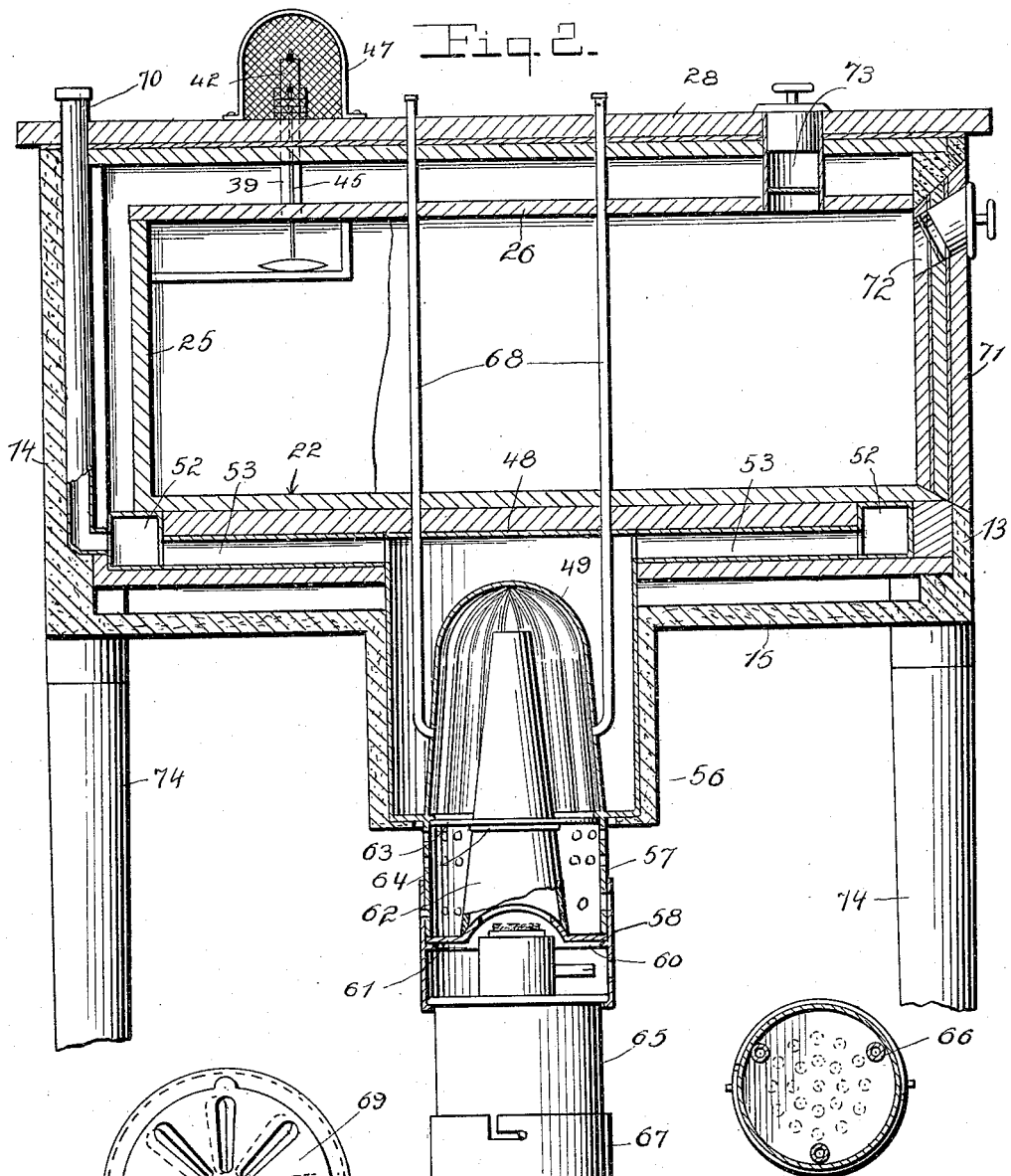

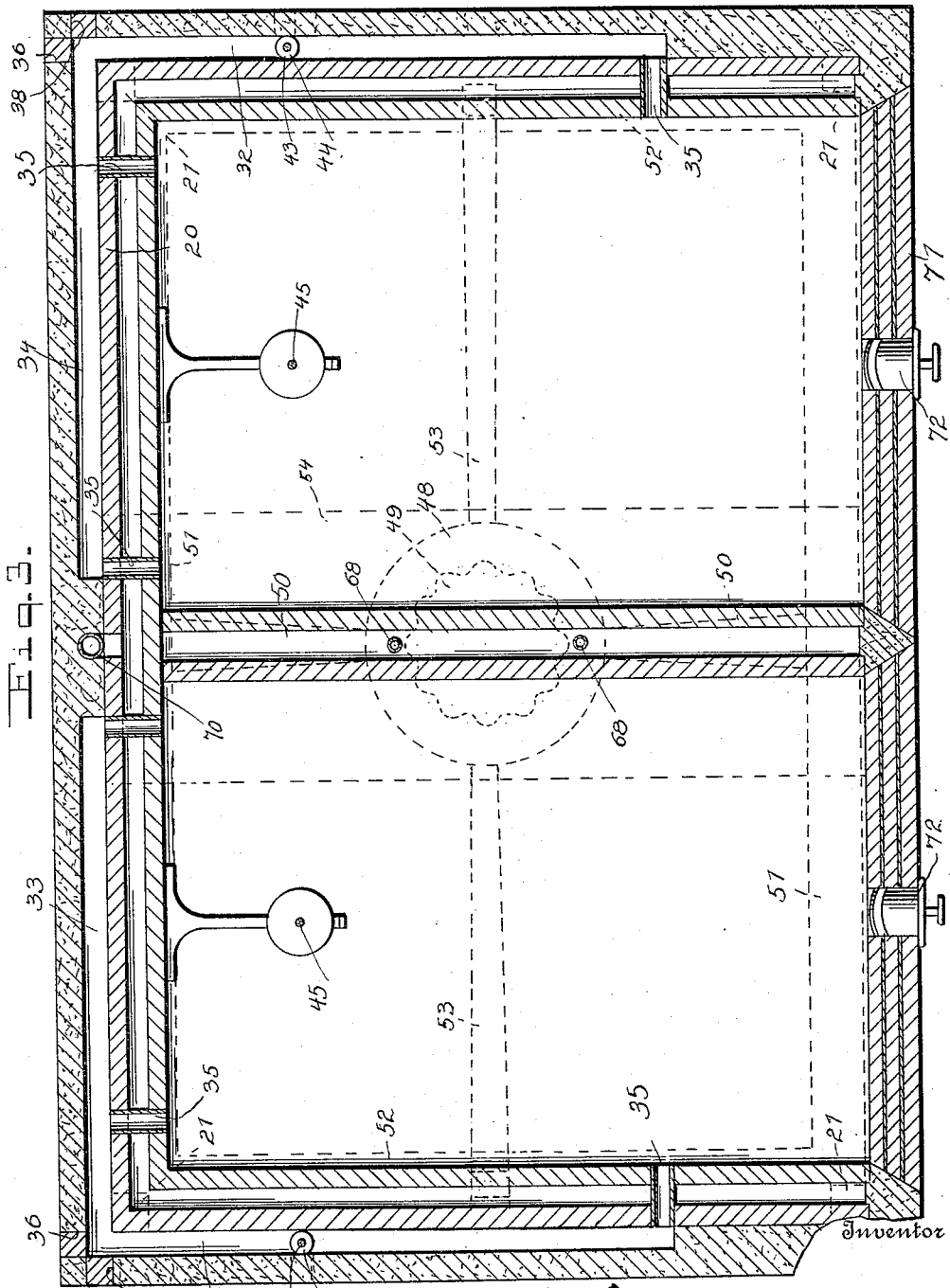

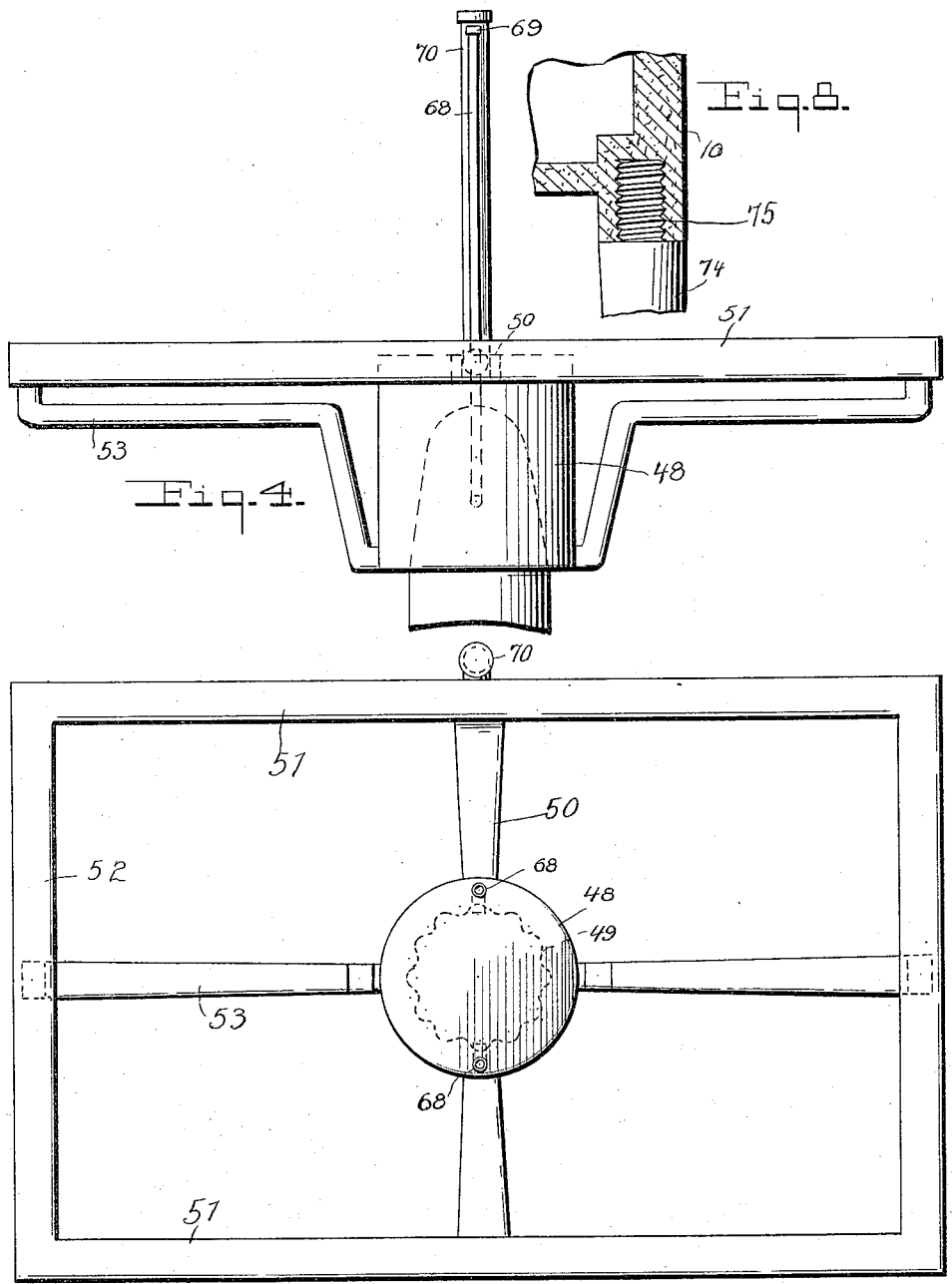

WILLIAM H. HOWARD, OF COTOPAXI, COLORADO.

INCUBATOR AND HEATING MEANS THEREFOR.

1,149,916.

Specification of Letters Patent. Patented Aug. 10, 1915.

Application filed May 8, 1913. Serial No. 766,376.

*To all whom it may concern:*

Be it known that I, WILLIAM H. HOWARD, a citizen of the United States, residing at Cotopaxi, in the county of Fremont, and State of Colorado, have invented certain new and useful Improvements in Incubators and Heating Means Therefor; and I do hereby declare the following to be a full, clear, and exact description of the invention, such as will enable others skilled in the art to which it appertains to make and use the same.

This invention comprehends improvements in incubators and heating means therefor, and relates more particularly to a novelly constructed casing which forms the body of the incubator.

The primary object of the invention is to provide an incubator having an outer casing formed of compressed wood fiber or a similar material and having ventilating flues formed in the walls thereof.

Another object of the invention is to provide a novel form of heating means to be used in connection with an incubator of this construction.

The invention also aims to generally improve incubators to render them more practical, efficient, and commercially desirable.

With these and other objects in view, as will become more apparent as the description proceeds, the invention consists in certain novel features of construction, combination, and arrangement of parts, as will be hereinafter described and claimed.

For a complete understanding of my invention, reference is to be had to the following description and accompanying drawings, in which, Figure 1 is a longitudinal vertical sectional view through my improved incubator and heating means therefor, Fig. 1ª is a fragmentary elevation, partly in section, of the heating lamp and coöperating structure, Fig. 2 is a vertical transverse sectional view, Fig. 3 is a horizontal sectional view taken on the plane of line 3—3 of Fig. 1, Fig. 4 is a side elevation of the heating apparatus, Fig. 5 is a top plan view of the same, Fig. 6 is a detail view of the top of one of the ventilating pipes leading from the heater, Fig. 7 is a section taken on the plane of line 7—7 of Fig. 1ª, and, Fig. 8 is a detail view of the corner construction, showing the manner in which the legs of the incubator are connected to the body thereof.

In the following description and accompanying drawings, similar parts will be referred to and designated by like reference characters.

Referring in detail to the drawings by numerals, 10 designates, generally, the body or exterior casing of my improved incubator. This body is preferably formed in one piece of compressed wood fiber or a similar suitable material. It is rectangular in cross-section and comprises end walls 11 and 12, front and rear walls 13 and 14, and a bottom 15.

An inner casing, generally designated 16, and comprising a bottom 17, end walls 18 and 19, and a rear wall 20 is positioned within the casing 10 and rests upon supporting blocks or projections 21, which are formed along the bottom 15 adjacent the upstanding walls. The supporting blocks 21 space the bottom of the inner casing from that of the outer casing so as to provide for the reception of a portion of the heating apparatus to be described later. An incubating inclosure, generally designated 22, comprising the bottom 23, end walls 24, a rear wall 25, and a top wall 26, is positioned within the interior casing, as clearly shown in Figs. 1 and 2. Spaced parallel partitions 27 are arranged vertically within the incubating inclosure to divide the same into two non-communicating compartments, in which are positioned suitable egg trays and chick trays. The walls of the incubating inclosure are separated from the walls of the interior casing to provide heating spaces.

The top of the incubator is closed by a removable cover 28, which is supported by the upper edges of the exterior and interior casings. A dead air space 29 is provided between the cover 28 and the top of the incubating inclosure.

The exterior casing is formed in each end wall with a vertical air passage 30, which passage communicates with the atmosphere by means of the openings 31 adjacent their lower ends. Horizontal flues or air passages 32 connect with the horizontal air passages 33 and 34, respectively, which are formed in the rear wall 14 of the outer casing. Short pipes 35 lead from the air passages 32, 33 and 34 into the chambers of the incubating inclosure. The air passages just described are for ventilating purposes and are preferably formed by withdrawing suitable cores which were embedded in the outer casing when the same was formed. The cores which form the vertical passages 30 may be removed through the upper edges of the end walls 11 and 12, before the cover 28 is placed in position. The cores which form the horizontal passages 32, 33 and 34 may be withdrawn through the openings 36, 37, and 38, respectively. Additional ventilating means is also provided by the pipes 39 and 40, which extend through the cover 28 into the incubating inclosure and dead air space 29, respectively.

Levers 41 and 42 are pivotally supported intermediate their ends upon the cover 28 and have connected to their outer ends, depending valve rods 43, which extend downwardly through the vertical air passages 30 and which have attached to their lower extremities the valves 44, that are adapted to open and close the openings 31.

When the temperature within the incubating inclosure becomes excessively high, the thermostatically operated rods 45 raise the inner ends of the levers 41 and 42, thus lowering the valves 44 below the openings 31. Simultaneous with the lowering of the valves 44, caps 46 are lifted from over the pipes 39 and 40. Fresh air will then flow into the incubating chambers and the heated air therein will exhaust through the pipes 39. The hot air contained within the dead air space 29 may escape through the pipes 40.

Suitable housings 47 are positioned upon the cover 28 and protect the movable parts arranged therein.

My improved heating apparatus which is designed for use in connection with the before described incubator construction, includes a preferably cylindrical boiler 48 which has a thimble 49 formed therein. Supply pipes 50 extend laterally from diametrically opposite points adjacent the top of the boiler and communicate with circulating pipes 51 and 52. Return pipes 53 extend inwardly from the circulating pipes 52 and enter the boiler at diametrically opposite points adjacent the bottom. The boiler 48 extends upwardly through the bottom 17 of the inner casing, as clearly shown in Fig. 1, and a protecting strip 54 is interposed between the boiler and the bottom of the incubating inclosure. The circulating pipes 51 and 52 are supported upon the bottom of the inner casing and extend entirely around the same adjacent the walls thereof. The return pipes 53 are positioned between the bottoms of the inner and outer casings and the downwardly projecting portions of said pipes are surrounded by offset portions 55 formed upon that portion 56 of the outer casing which surrounds the boiler.

A depending flange or rim 57 perforated as at 57′, extends from the bottom of the boiler and a sleeve 58 is connected thereto by means of the pins 59, which work within a bayonet slot. The sleeve 58 is formed with an annular interior rib 60 which supports a burner plate 61. A lamp chimney or flue 62 rests upon the burner plate and projects into the thimble 49. A division plate 63 is supported around the chimney 62 by means of the flange 64 and closes the lower end of the thimble.

An oil lamp 65 is supported by the sleeve 58 and has air pipes 66 extending through the oil chamber thereof. A cap 67 is removably connected to the lamp and extends across the lower ends of the air pipes 66, so as to prevent gusts of wind affecting the flame of the lamp. The bottom of the cap is perforated, as shown.

Ventilating pipes 68 communicate at their lower ends with the interior of the thimble 49, extend upwardly between the partitions 27, and project through the cover 28. The upper extremities of the ventilating pipe 68 have rotatably secured thereto slotted disks 69, as clearly shown in Fig. 6, said disks controlling the flow of heated air from the thimble through said pipes.

It will be seen that my improved heating apparatus when used in conjunction with an incubator of the before described construction, will serve to efficiently heat the same with the use of very little oil. The heated water will circulate freely through the circulating pipes and warm the air between the incubating inclosure and the inner casing. The boiler may be supplied with water through a filling pipe 70, which connects with the rear circulating pipe 51 and which extends upwardly through a recess formed in the rear wall of the exterior casing.

Doors 71 are provided in the front wall of the exterior casing and these doors are equipped with sight openings 72, by means of which the interior of the incubating inclosure may be viewed. Additional sight openings 73 pierce the cover 28 and the top of the incubating inclosure. The incubator is preferably supported upon legs or standards 74, which are reduced in diameter at their upper ends and threaded to fit within sockets formed in the corners of the outer casing, as clearly shown in Fig. 8.

From the foregoing description taken in connection with the accompanying drawing, it will be seen that I have provided a very simply constructed incubator so formed as to best conserve the heat and protect the eggs from all chilling drafts.

It is to be understood that while I have shown and described the preferred construction of my incubator and heating means therefor, I may vary somewhat from the structures as disclosed, without departing from the scope and spirit of the invention.

Having thus described my invention, what I claim is:—

1. In an incubator, an outer casing formed of a single piece of compressed wood fiber material, supporting projections carried by the interior of said casing adjacent the vertical end walls, an inner casing mounted within said outer casing and held spaced from the inner surface of the bottom of said outer casing by said supporting projections, a depending off set portion formed upon the bottom of said outer casing, a boiler carried by said depending offset portion and having its upper end extending into said inner casing, and an incubating casing positioned within said inner casing and resting upon the upper end of said boiler.

2. In an incubator, an outer casing formed of a single piece of compressed wood fiber material, supporting projections carried by the interior of said casing adjacent the vertical end walls, an inner casing mounted within said outer casing and held spaced from the inner surface of the bottom of said outer casing by said supporting projections, a depending offset portion formed upon the bottom of said outer casing, a boiler carried by said depending offset portion and having its upper end extending into said inner casing, an incubating casing positioned within said inner casing and resting upon the upper end of said boiler, a plurality of heat circulating pipes communicating with said boiler and extending along the under surface of and into said inner casing for circulating a heating element about said incubating casing, and thermostatically operated mechanism for regulating the heat of said incubating casing.

3. In an incubator, an outer casing formed of a single piece of compressed wood fiber material, supporting projections carried by the interior of said casing adjacent the vertical end walls, an inner casing mounted within said outer casing and held spaced from the inner surface of the bottom of said outer casing by said supporting projections, a depending offset portion formed upon the bottom of said outer casing, a boiler carried by said depending offset portion and having its upper end extending into said inner casing, an incubating casing positioned within said inner casing and resting upon the upper end of said boiler, a plurality of heat circulating pipes communicating with said boiler and extending along the under surface of and into said inner casing for circulating the heating element about said incubating casing, thermostatically operated means for regulating the heat of said incubating casing, a centrally disposed thimble formed in said boiler and having its sides projecting below the bottom of said boiler and said depending offset portion, and a heating agent support detachably and pendently carried by the projecting sides of said thimble.

In testimony whereof I affix my signature in presence of two witnesses.

WILLIAM H. HOWARD.

Witnesses:
W. V. HENDRICKS,
JOHN R. WORTH.

Copies of this patent may be obtained for five cents each, by addressing the "Commissioner of Patents, Washington, D. C."